(12) United States Patent
Slavens et al.

(10) Patent No.: US 10,307,817 B2
(45) Date of Patent: *Jun. 4, 2019

(54) ADDITIVELY MANUFACTURED CASTING ARTICLES FOR MANUFACTURING GAS TURBINE ENGINE PARTS

(71) Applicant: UNITED TECHNOLOGIES CORPORATION, Hartford, CT (US)

(72) Inventors: Thomas N. Slavens, Vernon, CT (US); Mark F. Zelesky, Bolton, CT (US); JinQuan Xu, East Greenwich, RI (US); Joel H. Wagner, Wethersfield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 620 days.

This patent is subject to a terminal disclaimer.

(21) Appl. No.: 14/870,443

(22) Filed: Sep. 30, 2015

(65) Prior Publication Data

US 2016/0184884 A1 Jun. 30, 2016

Related U.S. Application Data

(60) Provisional application No. 62/073,200, filed on Oct. 31, 2014.

(51) Int. Cl.
*B22C 9/10* (2006.01)
*B22C 9/24* (2006.01)
(Continued)

(52) U.S. Cl.
CPC ............. *B22C 9/24* (2013.01); *B22C 1/00* (2013.01); *B22C 9/02* (2013.01); *B22C 9/10* (2013.01);
(Continued)

(58) Field of Classification Search
CPC ............ B22C 9/10; B22C 9/103; B22C 9/106; B22C 9/24; B22D 29/001; B22D 29/002
(Continued)

(56) References Cited

U.S. PATENT DOCUMENTS 6,155,331 A 12/2000 Langer et al.
6,244,327 B1 * 6/2001 Frasier .................. B22C 9/04
164/133

(Continued)

FOREIGN PATENT DOCUMENTS

DE 4440397 C1 9/1995
EP 2551041 1/2013
JP H08309479 A 11/1996

OTHER PUBLICATIONS

Extended European Search Report for European Application No. EP 15 19 2298.6 dated Mar. 24, 2016.
(Continued)

*Primary Examiner* — Kevin P Kerns
(74) *Attorney, Agent, or Firm* — Carlson, Gaskey & Olds, P.C.

(57) ABSTRACT

A casting article according to another exemplary aspect of the present disclosure includes, among other things, a circuit forming portion including an interior channel and an outer shell body that surrounds the interior channel. An engineered failure feature is formed in the outer shell body and is configured to increase compressibility of the casting article during a casting process.

13 Claims, 7 Drawing Sheets

(51) Int. Cl.
  *B22D 29/00* (2006.01)
  *B22F 3/105* (2006.01)
  *B29C 67/00* (2017.01)
  *B22C 1/00* (2006.01)
  *B22C 9/02* (2006.01)
  *F01D 5/18* (2006.01)
  *B22F 5/00* (2006.01)
  *B22F 5/04* (2006.01)
  *B33Y 80/00* (2015.01)
  *B33Y 10/00* (2015.01)

(52) U.S. Cl.
  CPC .......... *B22C 9/106* (2013.01); *B22D 29/002* (2013.01); *B22F 3/1055* (2013.01); *B22F 5/009* (2013.01); *B22F 5/04* (2013.01); *B29C 67/0077* (2013.01); *F01D 5/18* (2013.01); *B33Y 10/00* (2014.12); *B33Y 80/00* (2014.12); *F05D 2230/30* (2013.01); *Y02P 10/292* (2015.11); *Y02P 10/295* (2015.11)

(58) Field of Classification Search
  USPC ......................................................... 164/369
  See application file for complete search history.

(56) References Cited

U.S. PATENT DOCUMENTS

| | | | |
|---|---|---|---|
| 6,340,047 B1 * | 1/2002 | Frey | B22C 21/14 164/122.1 |
| 6,832,889 B1 * | 12/2004 | Lee et al. | F01D 5/184 415/115 |
| 6,913,064 B2 | 7/2005 | Beals et al. | |
| 7,866,950 B1 | 1/2011 | Wilson, Jr. | |
| 8,047,789 B1 | 11/2011 | Liang | |
| 8,057,183 B1 | 11/2011 | Liang | |
| 8,066,483 B1 | 11/2011 | Liang | |
| 8,096,766 B1 | 1/2012 | Downs | |
| 8,109,726 B2 | 2/2012 | Liang | |
| 8,162,609 B1 | 4/2012 | Liang | |
| 8,317,475 B1 | 11/2012 | Downs | |
| 8,322,988 B1 | 12/2012 | Downs et al. | |
| 10,040,115 B2 * | 8/2018 | Slavens et al. | B22C 9/10 |
| 2002/0119047 A1 * | 8/2002 | Starkweather | F01D 5/187 416/97 R |
| 2004/0219016 A1 * | 11/2004 | Demers et al. | F01D 5/186 416/97 R |
| 2005/0232769 A1 * | 10/2005 | Lee et al. | F01D 5/187 416/97 R |
| 2009/0285684 A1 * | 11/2009 | Pinero et al. | F01D 5/187 416/92 |
| 2010/0003619 A1 | 1/2010 | Das et al. | |
| 2010/0025001 A1 | 2/2010 | Lee et al. | |
| 2012/0291983 A1 | 11/2012 | Graham et al. | |
| 2013/0026338 A1 | 1/2013 | Castle et al. | |
| 2013/0071562 A1 | 3/2013 | Szuromi et al. | |
| 2013/0283816 A1 * | 10/2013 | Smith et al. | B64C 39/024 60/784 |
| 2014/0102656 A1 | 5/2014 | Propheter-Hinckley et al. | |

OTHER PUBLICATIONS

Extended European Search Report for European Application No. 15192305.9, dated Mar. 29, 2016.

* cited by examiner

ADDITIVELY MANUFACTURED CASTING ARTICLES FOR MANUFACTURING GAS TURBINE ENGINE PARTS

CROSS-REFERENCE TO RELATED APPLICATION

This application claims priority to U.S. Provisional Application No. 62/073,200, filed Oct. 31, 2014.

BACKGROUND

This disclosure relates generally to an additively manufactured casting article and method for preparing the same. The casting article can be used to cast a gas turbine engine part having a desired internal cooling circuitry.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other engine loads.

Due to their exposure to hot combustion gases, numerous gas turbine engine parts may include internal cooling features. Dedicated cooling air may be extracted from the compressor section and distributed throughout the part via the internal cooling features to cool the part. Often these parts are cast using an investment casting process. A mold having two or more portions secured to one another defines an exterior surface of the part, and a core positioned within the mold forms the internal cooling features of the part, including but not limited to cooling passages, impingement holes, ribs, microcircuits, or other structures. The core is a solid structure that must be leached from the part post-casting.

SUMMARY

A casting article according to another exemplary aspect of the present disclosure includes, among other things, a circuit forming portion including an interior channel and an outer shell body that surrounds the interior channel. An engineered failure feature is formed in the outer shell body and is configured to increase compressibility of the casting article during a casting process.

In a further non-limiting embodiment of the foregoing casting article, the engineered failure feature includes a thinned portion formed in the outer shell body. The thinned portion has a reduced thickness compared to a second portion of the outer shell body.

In a further non-limiting embodiment of either of the foregoing casting articles, the engineered failure feature includes an internal support that extends between a suction side forming wall and a pressure side forming wall of the outer shell body.

In a further non-limiting embodiment of any of the foregoing casting articles, the engineered failure feature includes at least one porous area formed in the outer shell body. The at least one porous area has a first density that is less than a second density of a second portion of the outer shell body.

In a further non-limiting embodiment of any of the foregoing casting articles, the interior channel establishes a leaching path through the circuit forming portion.

In a further non-limiting embodiment of any of the foregoing casting articles, a plurality of engineered failure features are formed in the outer shell body.

In a further non-limiting embodiment of any of the foregoing casting articles, the engineered failure feature includes a thinned portion formed in a rib forming wall of the outer shell body.

In a further non-limiting embodiment of any of the foregoing casting articles, the engineered failure feature includes at least one porous area formed in a rib forming wall of the outer shell body.

In a further non-limiting embodiment of any of the foregoing casting articles, the at least one porous area is configured to fail toward the interior channel.

In a further non-limiting embodiment of any of the foregoing casting articles, the engineered failure feature is configured to deflect toward a center of the interior channel.

A method of preparing a casting article for manufacturing a gas turbine engine part according to another exemplary aspect of the present disclosure includes, among other things, communicating a powdered material to an additive manufacturing system. The powdered material includes at least one of a silica material, an alumina material, and a refractory metal material. The additive manufacturing system is used to manufacture a casting article layer by layer. The casting article includes a plurality of circuit forming portions, at least one of the circuit forming portions including an interior channel surrounded by an outer shell body. An engineered failure feature is formed in the outer shell body.

In a further non-limiting embodiment of either of the foregoing methods, the interior channel that establishes a hollow opening through the circuit forming portion In a further non-limiting embodiment of any of the foregoing methods, the engineered failure feature includes a thinned portion formed in the outer shell body, an internal support that extends between a suction side forming wall and a pressure side forming wall of the outer shell body, or a porous area formed in the outer shell body.

In a further non-limiting embodiment of any of the foregoing methods, the step of using the additive manufacturing system includes melting a first layer of the powdered material to form a first cross-sectional layer of the casting article, spreading a second layer of the powdered material on top of the first cross-sectional layer and melting the second layer to form a second cross-sectional layer of the casting article.

In a further non-limiting embodiment of any of the foregoing methods, the engineered failure feature includes an internal support that extends between a suction side forming wall and a pressure side forming wall of the outer shell body.

In a further non-limiting embodiment of any of the foregoing methods, the engineered failure feature includes at least one porous area formed in the outer shell body.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure describes an additively manufactured casting article, such as a core. An additive manufacturing system may be used to build the casting article layer by layer. The casting article includes a plurality of circuit forming portions. The circuit forming portions may be formed with interior channels. In some embodiments, the casting articles establish a leaching path for receiving a leaching fluid. The leaching path reduces the amount of time necessary to dissolve the core from a gas turbine engine part post-casting. In other embodiments, the casting articles are equipped with engineered failure areas. The engineered failure areas allow the circuit forming portions to deflect, crush or collapse at non-critical locations during part solidification to avoid damaging the cast part. These and other features are discussed in greater detail in the following paragraphs of this detailed description.

Figure 1:
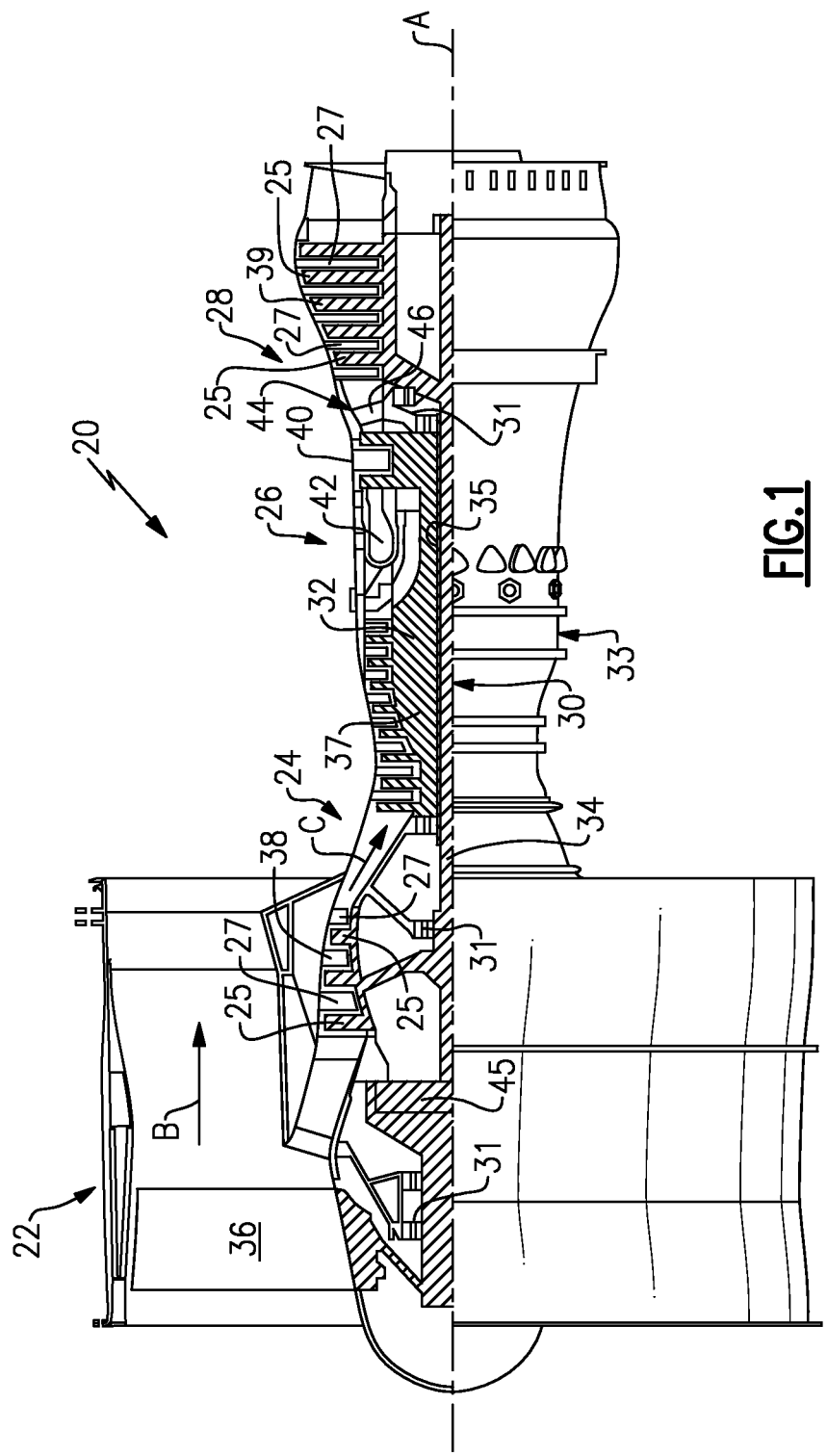
FIG. 1 illustrates a schematic, cross-sectional view of a gas turbine engine.

FIG. 1 schematically illustrates a gas turbine engine 20. In one non-limiting embodiment, the exemplary gas turbine engine 20 is a two-spool turbofan engine that generally incorporates a fan section 22, a compressor section 24, a combustor section 26 and a turbine section 28. Alternative engines might include an augmenter section (not shown) among other systems for features. The fan section 22 drives air along a bypass flow path B, while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only exemplary of one embodiment of a geared architecture engine and that the present disclosure is applicable to other gas turbine engines, including direct drive turbofans.

In this embodiment of the exemplary gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram\ °R)/(518.7°R)]^{0.5}$. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 create or extract energy (in the form of pressure) from the core airflow that is communicated through the gas turbine engine 20 along the core flow path C. The vanes 27 direct the core airflow to the blades 25 to either add or extract energy.

Various components of the gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling features for cooling the parts during engine operation. Additively manufactured casting articles for casting gas turbine engine parts with such internal cooling features are discussed in greater detail below.

Figure 2:
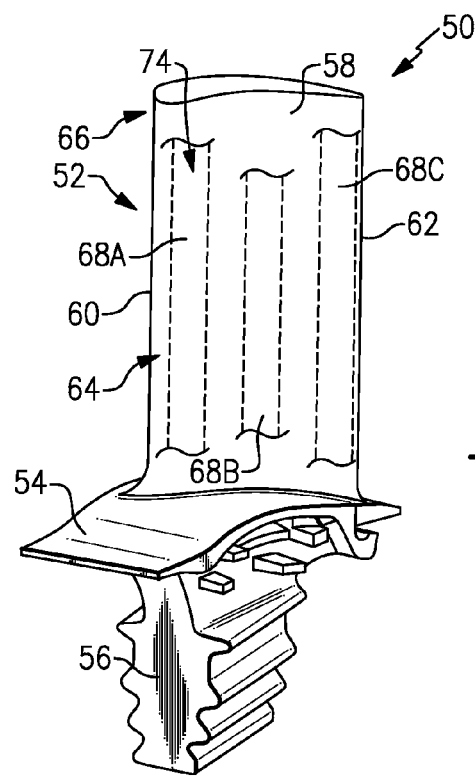
FIG. 2 illustrates a gas turbine engine part.
Figure 4:
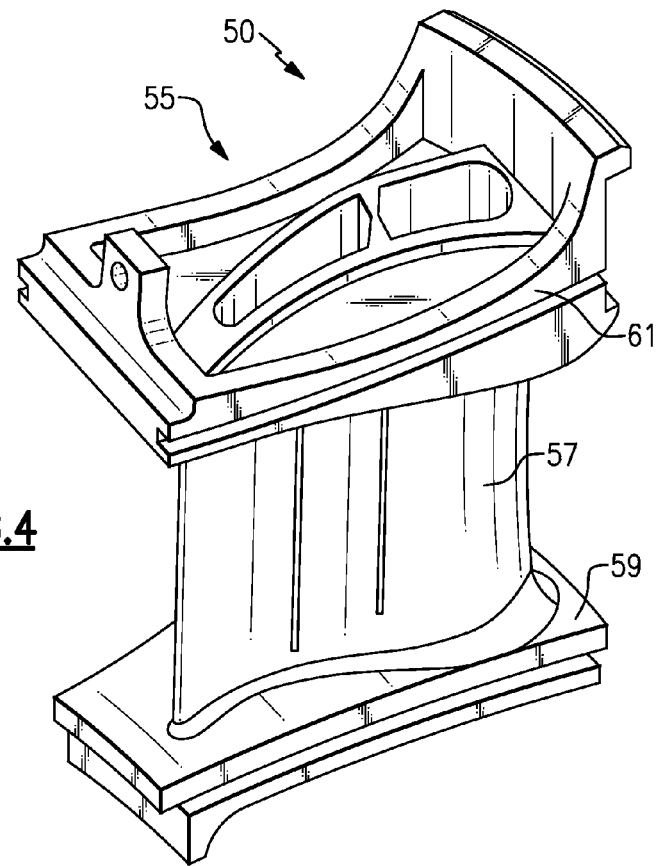
FIG. 4 illustrates another gas turbine engine part.

FIG. 2 illustrates a part 50 that can be manufactured in a casting process, such as an investment casting process. Other manufacturing techniques are also contemplated within the scope of this disclosure. In the illustrated embodiment, the part 50 is a blade 52 of the turbine section 28 of the gas turbine engine 20. Although the part 50 is illustrated as a turbine blade 52, the various features of this disclosure are applicable to any manufactured part of a gas turbine engine, including but not limited to vanes, blades, blade outer air seals (BOAS), or any other cast part. For example, in a second non-limiting embodiment, the part 50 could be a vane 55 that includes an airfoil 57 extending between an inner platform 59 and an outer platform 61 (see, for example, FIG. 4).

The part 50 includes a platform 54, a root 56, and an airfoil 58 that extends from the platform 54 in an opposite direction from the root 56. The airfoil 58 includes a leading edge 60, a trailing edge 62, a pressure side 64 and a suction side 66.

The part 50 can additionally include an internal circuitry 74 for cooling the part 50. The internal circuitry 74 may include internal cooling passages 68A, 68B, 68C and various microcircuits, skin cores, cooling holes, trailing edge exits or other internal cooling features. The internal cooling passages 68A, 68B, 68C and the various other internal cooling features define the internal circuitry 74. The internal circuitry 74 of the part 50 represents but one example of many potential cooling circuits, and the example shown is in no way intended to limit this disclosure. Stated another way, various alternative cooling passages and internal circuitry configurations could alternatively or additionally be cast into the part 50. The actual design of the internal circuitry 74 may depend on the cooling requirements of the part 50, among other criteria.

In operation, cooling airflow, such as bleed airflow from the compressor section 24 (see FIG. 1), is communicated through the internal cooling passages 68A, 68B, 68C and can be circulated through any internal cooling features. The cooling airflow is circulated through the internal circuitry 74 to cool the part 50.

Figure 3:
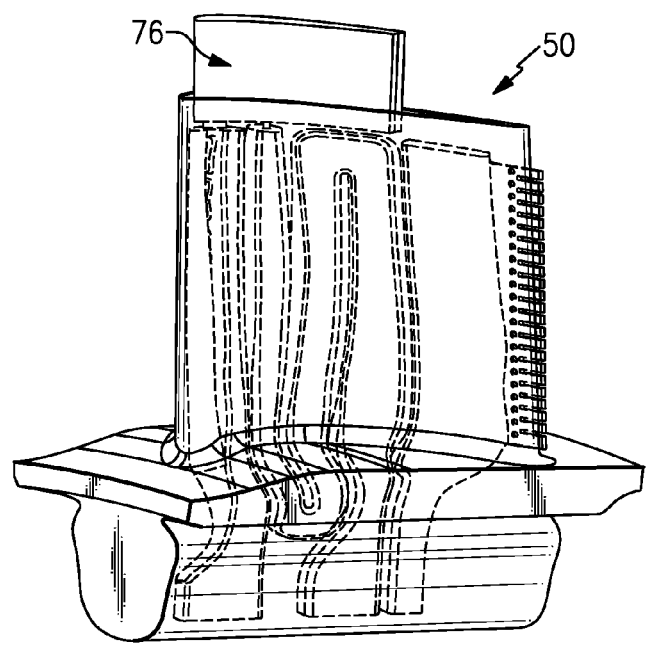
FIG. 3 illustrates the gas turbine engine part of FIG. 2 prior to removal of a core.

FIG. 3 illustrates the part 50 of FIG. 2 prior to removal of a core 76. The core 76 can be used during a manufacturing process as part of a casting system to define the internal circuitry 74 (see FIG. 2) of the part 50. The core 76 may be removed, such as in a leaching operation, to produce the part 50 shown in FIG. 2.

The core 76 includes a core geometry suitable to form the various features of the internal circuitry 74 (both the internal cooling passages 68A, 68B, 68C and any other internal cooling features). In one embodiment, the core 76 is a refractory metal core made out of a refractory metal such as molybdenum, tungsten, niobium, tantalum, rhenium or other refractory metal materials. Use of refractory metals affords the core 76 with the ability to withstand relatively high casting temperatures and provides some measure of ductility and fracture toughness. In another embodiment, ceramic, silica or alumina materials may be used to form the core 76. In yet another embodiment, any combination of materials, including but not limited to refractory metals, ceramics, silica, and alumina, may be used to prepare the core 76.

The core 76 may be prepared using an additive manufacturing process. An example additive manufacturing system and method for preparing a core is detailed below.

Figure 5:
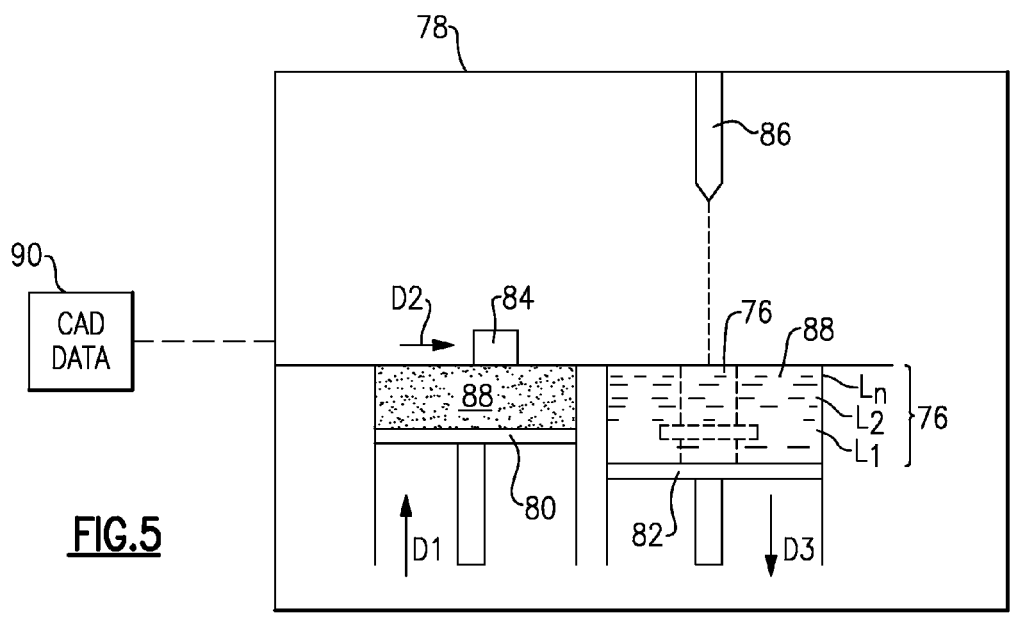
FIG. 5 illustrates an additive manufacturing system for constructing a casting article.

FIG. 5 illustrates an additive manufacturing system 78 that can be used to manufacture a casting article, such as the core 76 of FIG. 3 or any other casting article of a casting system, including cores, shells, gating, etc. (see FIG. 12 for example casting system). In one embodiment, the additive manufacturing system 78 includes a delivery platform 80, a build platform 82, a spreader 84 and a melting device 86 (or sintering device). The delivery platform 80 carries a powdered material 88, such as a refractory metal powder, a silica powder, an alumina powder, or a combination including at least two of such powders. The build platform 82 is a substrate on which the core 76 is additively built. The melting device 86 could include a laser or an electron beam melting device, although other melting and/or sintering devices are also contemplated.

In one non-limiting use of the additive manufacturing system 78, the delivery platform 80 is movable in a first direction D1 to position the powdered material 88 relative to the build platform 82. The spreader 84 can move in a second direction D2 (i.e., perpendicular to the first direction D1) to spread a thin layer of the powdered material 88 on the build platform 82. The melting device 86 may then be actuated to melt the layer of powdered material 88 at locations where the geometry of the core 76 is to exist to prepare a first layer L1 of the core 76. Some portion of the powdered material 88 may remain within the core 76 after the melting step. This powdered material 88 can be removed or remain inside the core 76 to provide support.

Once the first layer L1 is completed, the build platform 82 may be moved in a direction D3 (opposite of the direction D1). In one embodiment, the build platform 82 is moved in the direction D3 by a distance equal to about one layer. Next, another layer of the powdered material 88 may be deposited on the build platform 82 via the spreader 84. For example, the layer of powdered material 88 may be spread over the previously formed first layer L1. The melting device 86 melts the second layer of powdered material 88 to prepare a second layer L2 of the core 76. The second layer L2 is adhered to the first layer L1 during the melting process. This layer by layer process may be repeated over a total of Ln layers until the entire core 76 with a desired core geometry has been additively built.

In one embodiment, the layers L1 to Ln of the core 76 may be joined to one another with reference to CAD data 90, which defines a cross-section of a desired geometry of the core 76. The CAD data 90 is communicated to the additive manufacturing system 78 and provides the necessary numerical data for manufacturing the core 76.

The additive manufacturing system 78 and method of use described above is but one exemplary configuration for additively manufacturing a casting tool article, such as a core, shell or other article. It should be appreciated that the additive manufacturing system 78 could include additional features not described with reference to the highly schematic depiction of FIG. 5.

With the layers built upon one another and joined to one another cross-section by cross-section, a core 76 having any desired core geometry can be generated. For example, additively manufactured cores can be created with core geometries that provide internal channels. In one embodiment, the internal channels establish leaching paths for more effectively and efficiently leaching the core 76 from a cast part. In another embodiment, the internal channels include engineered failure features for enhancing core compressibility during a casting process. FIGS. 6-9 illustrate multiple core geometries that can be created using an additive manufacturing system and process similar to that described above. This disclosure is not limited to the exact core geometries that are shown, and it should be understood that any casting article can be additively manufactured to include any combination of features, including any combination of the features shown in FIGS. 6-9.

Figure 6:
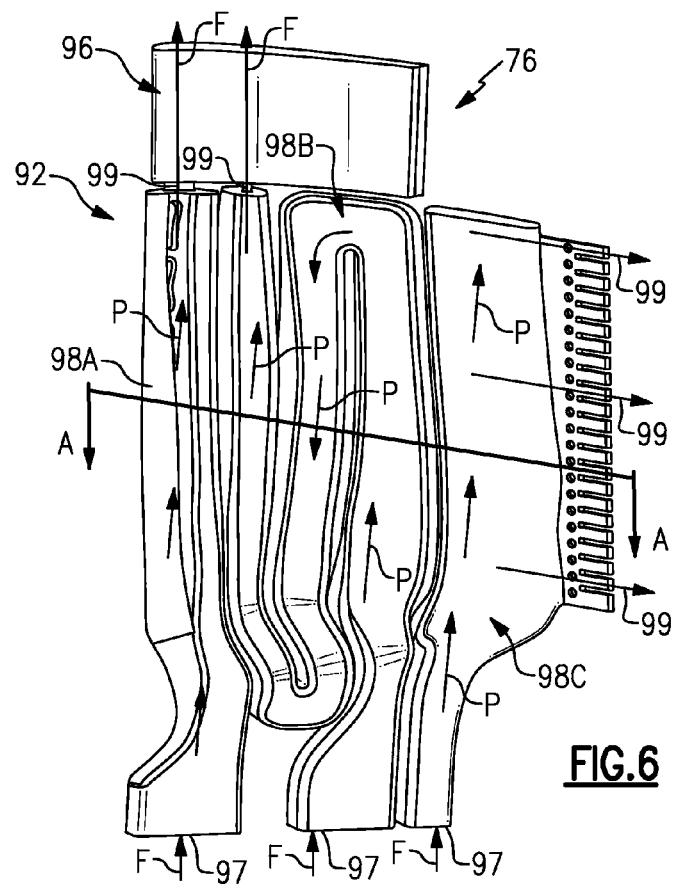
FIG. 6 illustrates a casting article according to a first embodiment of this disclosure.
Figure 7:
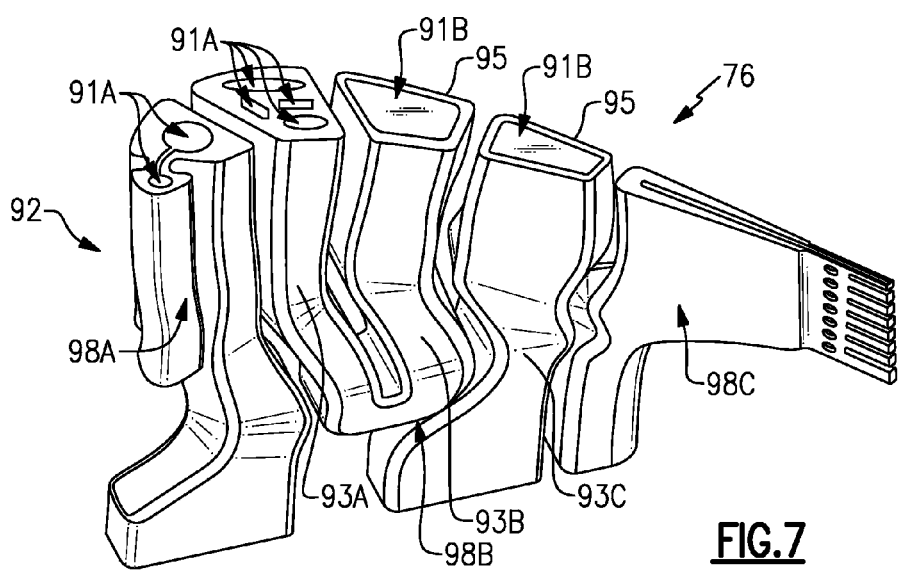
FIG. 7 illustrates a cross-sectional view through section A-A of the casting article of FIG. 6.

FIGS. 6 and 7 illustrate an exemplary casting core 76 according to a first embodiment of this disclosure. The core 76 may be additively manufactured to include a core geometry 92 that defines a dimensional negative of a desired internal circuitry of a cast gas turbine engine part. The core geometry 92 may include one or more circuit forming portions—here, circuit forming portions 98A, 98B and 98C. In another embodiment, the core geometry 92 includes a stabilizer portion 96 (see FIG. 6) for stabilizing a positioning one or more of the circuit forming portions 98A, 98B and 98C. During a casting process, the circuit forming portions 98A, 98B and 98C form the various passages and features of the cast gas turbine engine part (see, for example, the internal circuitry 74 of FIG. 2). In some embodiments, the stabilizer portion 96 may also establish a portion of the internal circuitry of a cast part, such as a tip plenum, as one non-limiting example.

In another non-limiting embodiment, the core geometry 92 includes a leading edge circuit forming portion 98A, a serpentine circuit forming portion 98B, and a trailing edge circuit forming portion 98C. The leading edge circuit forming portion 98A is configured to form a leading edge cooling circuit within a cast part, the serpentine circuit forming portion 98B is configured to form a serpentine cooling circuit within the cast part, and the trailing edge circuit forming portion 98C is configured to form a trailing edge cooling circuit within the cast part. The exemplary core geometry 92 is but a non-limiting example of one possible core geometry design. Other configurations are also contemplated within the scope of this disclosure.

One or more of the circuit forming portions 98A, 98B and 98C of the core 76 may be additively manufactured to include interior channels (see FIG. 7, labeled as either 91A or 91B). The interior channels 91A or 91B establish hollow openings through the circuit forming portions 98A, 98B and 98C for leaching the core 76 from a part post-casting. By leveraging additive manufacturing technologies such as described above, the core 76 can be formed to include interior channels 91A and/or 91B that allow for dissolving the core 76 from a cast part at a much higher rate than previously known leaching methods. In some embodiments, the interior channels 91A, 91B allow for a higher diffusion front between the core 76 and the leaching medium as compared to traditional solid cores.

The interior channels 91A, 91B may embody a variety of sizes and shapes. For example, in one embodiment, one or more of the circuit forming portions 98A, 98B and 98C include a plurality of the interior channels 91A which are configured as high convection channels that maintain relatively thin boundary layers and thus increased diffusion of the core 76 material into a leaching fluid that is forced through the interior channels 91A. In the illustrated embodiment, the leading edge circuit forming portion 98A and a first leg 93A of the serpentine circuit forming portion 98B include the "highly convective" type interior channels 91A. Some of the interior channels 91A may connect to one another as illustrated by the leading edge circuit forming portion 98A.

In another embodiment, one or more of the circuit forming portions 98A, 98B and 98C include a single, interior channel 91B profiling the interior of the circuit in which it resides. The profiling interior channel 91B maximizes the surface area of the circuit in contact with the leaching fluid. In embodiments that include the interior channel 91B, a majority of the surface area of the circuit forming portion 98A, 98B and 98C is encompassed by the void established by the interior channel 91B. Stated another way, the only solid portion of the circuit forming portions 98A, 98B and 98C including the interior channels 91B is an outer shell body 95 that circumscribes the interior channel 91B. The interior channels 91B may be useful for low-to-zero flow leaching situations such as may be encountered during a leaching operation that uses a submersion tank. In the illustrated embodiment, a second leg 93B and a third leg 93C of the serpentine circuit forming portion 98B include the "maximum surface area" type interior channels 91B.

In yet another embodiment, the core geometry 92 may be designed to include only the interior channels 91A, only the interior channels 91B, or a combination of the interior channels 91A and 91B. Although not shown, the interior channels 91A, 91B could include boundary layer disruption devices such as trip strips or pedestal arrays to promote diffusion of the core 76 material into the leaching fluid.

The interior channels 91A, 91B establish leaching paths P (see FIG. 6) through each circuit forming portion 98A, 98B and 98C. Each circuit forming portion 98A, 98B and 98C may include an inlet 97 and at least one outlet 99. A leaching fluid F may be communicated into the inlets 97, circuited along the leaching paths P, and then expelled through the outlets 99 to leach the core 76 from a cast part.

In another leaching embodiment, an abrasive suspension may be used in combination with the leaching fluid to remove the core 76. The abrasive suspension may include alumina particles, silica particle, refractory metal particles, etc. In one embodiment, the abrasive suspension may include particles made from the same material that the core 76 is additively manufactured from.

Figure 8:
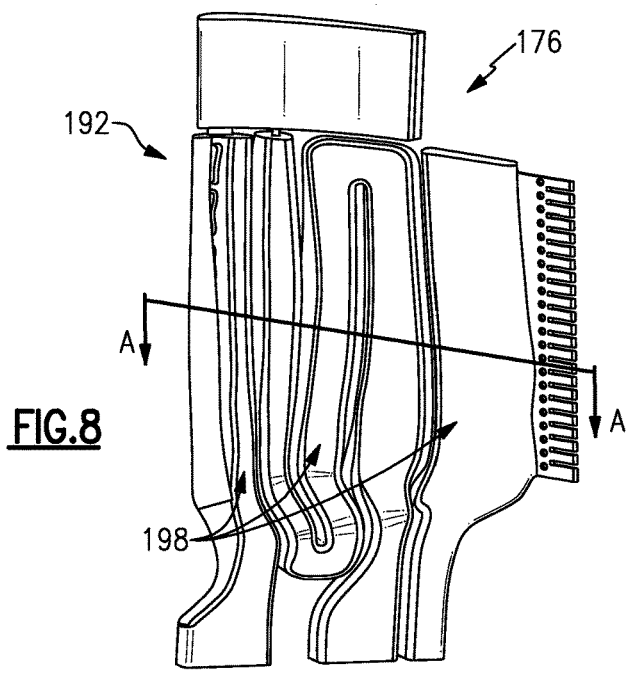
FIG. 8 illustrates a casting article according to a second embodiment of this disclosure.
Figure 9:
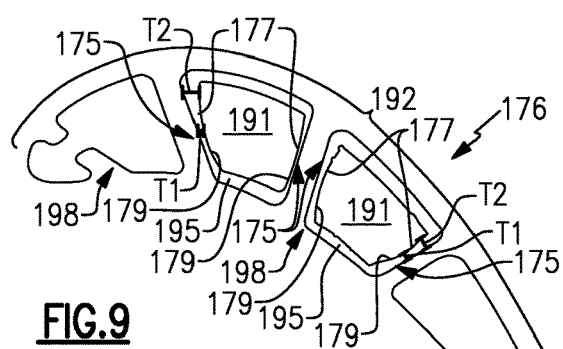
FIG. 9 illustrates a cross-sectional view through section A-A of the casting article of FIG. 8.

FIGS. 8 and 9 illustrate a core 176 according to another embodiment of this disclosure. In this disclosure, like reference numbers designate like elements where appropriate and reference numerals with the addition of 100 or multiples thereof designate modified elements that are understood to incorporate the same features and benefits of the corresponding original elements.

In this embodiment, the core 176 is formed using an additive manufacturing process to include a core geometry 192 having one or more circuit forming portions 198. One or more of the circuit forming portions 198 may include an interior channel 191. Each interior channel 191 may be surrounded by an outer shell body 195.

Some of the outer shell bodies 195 may be designed to include engineered failure features 175. The engineered failure features 175 are designed to allow the core 176 to fail (i.e., deflect, crush, collapse, etc.) during part solidification to avoid damaging critical surfaces of the casting. By engineering locations of lower load capability in locations where profile is non-critical or which solidify first (rendering the need of a molding surface unnecessary), the core 176 can be rendered more compliant to solidification-shrinkage, other tighter toleranced locations, or locations which solidify later. In one embodiment, shown in FIG. 9, the engineered failure feature 175 includes a thinned portion 177 of the outer shell body 195 that includes a first wall thickness T1 that is a reduced thickness compared a second thickness T2 of another portion of the outer shell body 195. The core 176 may collapse or deflect at the thinned portions 177 during solidification to avoid damaging the casting by conforming to the surrounding solidification of the casting material. In one embodiment, the core 176 collapses or deflects toward an interior of the circuit forming portion 198. The thinned portions 177 may be provided at any location of the outer shell body 195 for reducing rigidity at that location. In one embodiment, the thinned portions 177 are provided at non-critical locations of the outer shell body 195, such as within the rib forming walls 179.

Figures 10, 11:
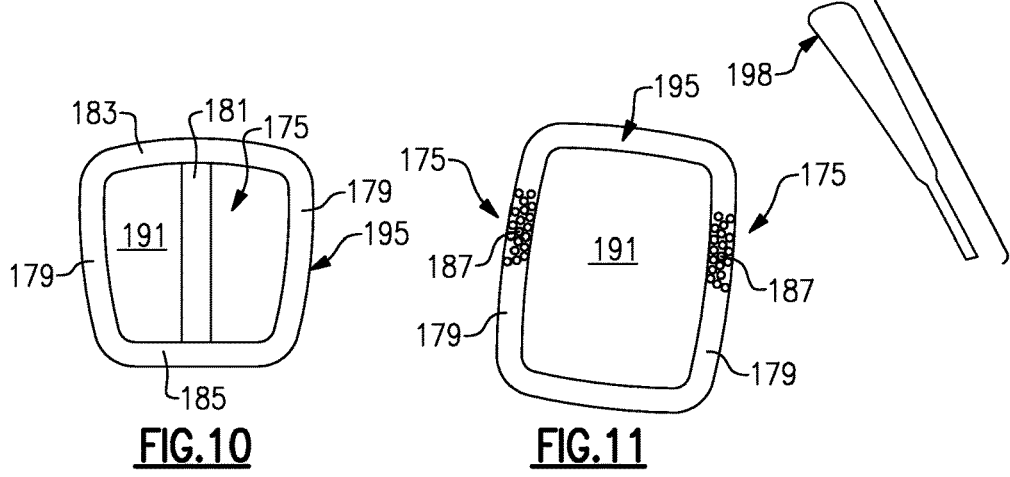
FIG. 10 illustrates an engineered failure feature of a core.
FIG. 11 illustrates another engineered failure feature of a core.

In another embodiment, shown in FIG. 10, the engineered failure feature 175 includes an internal support 181 that extends between a suction side forming wall 183 and a pressure side forming wall 185 of the outer shell body 195 within the interior channel 191. The internal support 181 redirects core deflections to non-critical locations, such as the rib forming walls 179, during solidification. The internal supports 181 may include any radial length.

In yet another embodiment, shown in FIG. 11, the engineered failure feature 175 includes one or more porous areas 187 formed into the outer shell body 195. In one embodiment, the porous areas 187 are formed within the rib forming walls 179. Other locations are also possible. The porous areas 187 are less dense than other portions of the outer shell body 195 and therefore are configured to deflect, crush, collapse, etc. at preferred locations during solidification. In one embodiment, the porous areas 187 fail toward the interior channel 191 in response to pressures that occur during solidification.

Figure 12A:
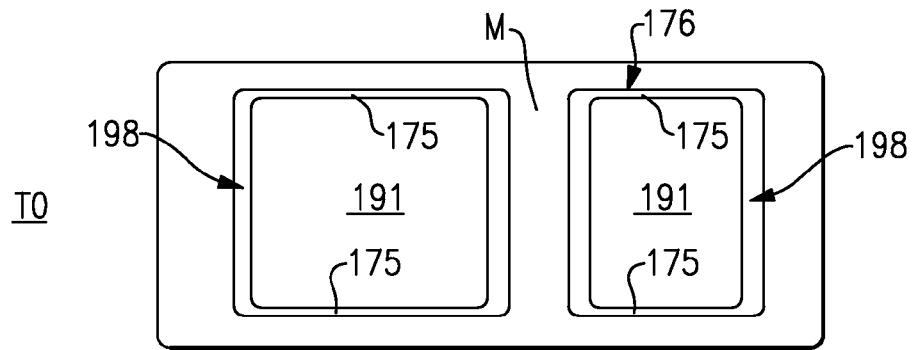
FIGS. 12A, 12B and 12C schematically illustrate deflection of an engineered failure feature of a core during a casting process.
Figure 12B:
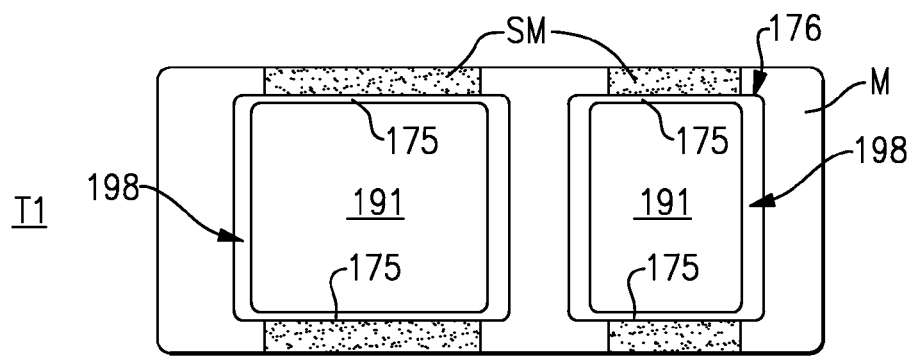
Figure 12C:
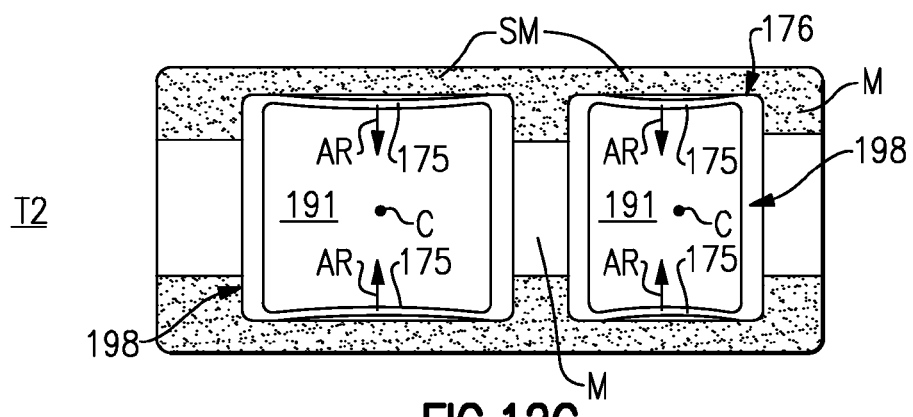

FIGS. 12A, 12B and 12C schematically illustrate the behavior of engineered failure features 175 of the core 176 during a casting process. The engineered failure features 175 may deflect toward a center C (see FIG. 12C) of the interior channels 191 during solidification of a molten metal M to allow core compliance around the interior channels 191. At time T0 of the casting process, shown in FIG. 12A, the core 176, including the circuit forming portions 198, is encapsulated within the molten metal M.

FIG. 12B shows the casting process at time T1 in which portions of the molten metal M have solidified to form solid metal portions SM. The initial solidification occurs near the engineered failure features 175 because these areas have a locally lower thermal mass due to reduced thickness, density, etc.

FIG. 12C shows the casting process at time T2 where the solidification front has progressed around the corners of the circuit forming portions 198 toward thicker portions of the circuit forming portions 198. As is evident from FIG. 12C, the solidification of the molten metal M has caused significant bounded shrinkage to the core 176 along the longitudinal direction of the casting. The engineered failure features 175 may thus flex in a direction of arrows AR away from the already solidified solid metal portions SM while retaining enough rigidity to accommodate any further solidification.

Figure 13:
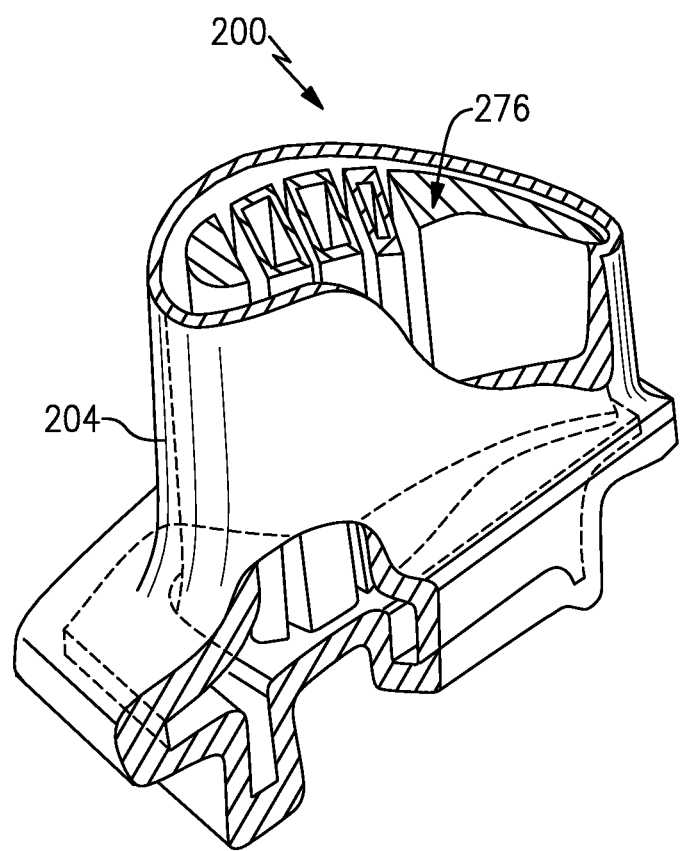
FIG. 13 illustrates a casting system that can be additively manufactured.

FIG. 13 illustrates a casting system 200 that can be used to cast a gas turbine engine part. The casting system 200 includes one or more casting articles. In one embodiment, the casting system 200 includes a core 276 that forms the internal features of the cast gas turbine engine part, and a shell 204 for forming the external features of the cast gas turbine engine part. The core 276 can include any of the core geometries described above, or any other geometry. The casting system 200 can additionally include gating, sprue cups, risers, etc. The entirety of the casting system 200, or only portions thereof, may be additively manufactured using the system or methods described above.

Although the different non-limiting embodiments are illustrated as having specific components, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A casting article, comprising:
   a circuit forming portion including an interior channel and an outer shell body that surrounds said interior channel; and
   at least one porous area formed in said outer shell body at a portion of said outer shell body surrounding said interior channel and having a first density that is less than a second density of a second portion of said outer shell body and configured to increase compressibility of the casting article during a casting process, wherein the at least one porous area is configured to deflect, crush, or collapse at a preferred location during solidification of a molten metal encapsulating the casting article.

2. The casting article as recited in claim 1, wherein said interior channel establishes a leaching path through said circuit forming portion.

3. The casting article as recited in claim 1, comprising a plurality of porous areas having said first density formed in said outer shell body.

4. The casting article as recited in claim 1, wherein the at least one porous area is formed in a rib forming wall of said outer shell body configured to form a rib.

5. The casting article as recited in claim 4, wherein said at least one porous area is configured to fail toward said interior channel.

6. The casting article as recited in claim 1, wherein said circuit forming portion comprises refractory metal.

7. A casting article, comprising:
   a circuit forming portion including a plurality of interior channels establishing a leaching path through said circuit forming portion and an outer shell body that surrounds one of said plurality of interior channels; and a thinned portion formed in a rib forming wall of said outer shell body configured to form a rib between said plurality of channels at a portion of said outer shell body surrounding said one of said interior channels, said thinned portion having a reduced thickness compared to a second portion of said outer shell body and configured to deflect, crush, or collapse at a preferred location during solidification of a molten metal encapsulating the casting article.

8. The casting article as recited in claim 7, wherein said thinned portion is configured to deflect, crush, or collapse toward said one of said interior channels during solidification of a molten metal encapsulating the casting article.

9. The casting article as recited in claim 7, wherein said circuit forming portion comprises refractory metal.

10. A casting article, comprising:

a circuit forming portion including a plurality of interior channels establishing a leaching path through said circuit forming portion and an outer shell body that surrounds one of said plurality of interior channels; and at least one porous area formed in a rib forming wall of said outer shell body configured to form a rib between said plurality of channels at a portion of said outer shell body surrounding said one of said interior channels and having a first density that is less than a second density of a second portion of said outer shell body and configured to deflect, crush, or collapse at a preferred location during solidification of a molten metal encapsulating the casting article.

11. The casting article as recited in claim 10, wherein said at least one porous area is configured to deflect, crush, or collapse toward said one of said interior channels during solidification of a molten metal encapsulating the casting article.

12. The casting article as recited in claim 11, wherein said rib includes said molten metal.

13. The casting article as recited in claim 10, wherein said circuit forming portion comprises refractory metal.

* * * * *